(12) United States Patent
Hassidim et al.

(10) Patent No.: US 9,015,340 B2
(45) Date of Patent: Apr. 21, 2015

(54) SPLITTING A NETWORK TRAFFIC FLOW (75) Inventors: Avinatan Hassidim, Petah Tikva (IL); Michal Segalov, Haifa (IL); Tzvika Hartman, Mazkeret Batya (IL); Dan Raz, Timrat (IL)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 13/592,098

(22) Filed: Aug. 22, 2012

(65) Prior Publication Data

US 2013/0117466 A1    May 9, 2013

(30) Foreign Application Priority Data

Nov. 8, 2011   (IL) .......................................... 216207

(51) Int. Cl.
*G06F 15/16* (2006.01)
*H04L 29/06* (2006.01)
*H04L 12/64* (2006.01)
*H04L 12/803* (2013.01)

(52) U.S. Cl.
CPC ...... *H04L 29/06088* (2013.01); *H04L 12/6418* (2013.01); *H04L 47/125* (2013.01)

(58) Field of Classification Search
CPC ....... H04L 47/00; H04L 47/17; H04L 45/123; H04L 45/124; H04L 45/127
USPC .................. 709/223, 226, 232, 233, 234, 235
See application file for complete search history.

(56) References Cited

U.S. PATENT DOCUMENTS

| | | | | |
|---|---|---|---|---|
| 7,408,881 | B2 * | 8/2008 | Acharya et al. | 370/238 |
| 7,584,298 | B2 * | 9/2009 | Klinker et al. | 709/238 |
| 2005/0201285 | A1 * | 9/2005 | Simonis | 370/235 |
| 2006/0067235 | A1 * | 3/2006 | Acharya et al. | 370/238 |
| 2006/0182034 | A1 * | 8/2006 | Klinker et al. | 370/238 |
| 2008/0089333 | A1 * | 4/2008 | Kozat et al. | 370/390 |
| 2008/0253286 | A1 * | 10/2008 | Shriram et al. | 370/232 |
| 2013/0097592 | A1 * | 4/2013 | Simitsis et al. | 717/156 |

OTHER PUBLICATIONS

B. Vatinlen et al., Simple Bounds and Greedy Algorithms for Decomposing a Flow into a Minimal Set of Paths, European Journal of Operational Research 185 (2008) 1390-1401, accepted Sep. 9, 2004, 12 pages.
Yann Hendel et al., Decomposition of Flow into Paths to Minimize Their Length, available at http://www.google.com/url?sa=t&rct=j&q=wieslaw%20kubiak%20decomposition%20of%20flow%20into%20paths&source=web&cd=1&cad=rja&ved=0CDcQFjAA&url=http%3A%2F%2Fciteseerx.ist.psu.edu%2Fviewdoc%2Fdownload%3Fdoi%3D10.1.1.87.3760%26rep%3Drep1%26type%3Dpdf&ei=7iE1ULrMJYO9ywGMzoGYCw&usg=AFQjCNH2r6Fm8J_XJ6hVTDtDhVMBufp1aA, Sep. 15, 2009, 15 pages.

* cited by examiner

*Primary Examiner* — Lynn Feild
*Assistant Examiner* — Jonathan Bui
(74) *Attorney, Agent, or Firm* — Edward A. Gordon; Foley & Lardner LLP (57) ABSTRACT Systems and methods for splitting a network traffic flow in a data network are described. A flow of traffic between a source node and a destination node in the data network is split into a set of data paths. A data path includes one or more data links between nodes in the data network. A submap of the data network that excludes at least one data link is used to determine the set of flow paths.

20 Claims, 6 Drawing Sheets

SPLITTING A NETWORK TRAFFIC FLOW

RELATED APPLICATIONS

The present application claims foreign priority from Israeli Application No. 216207 filed in Israel on Nov. 8, 2011.

BACKGROUND

The present disclosure relates generally to splitting a network traffic flow, and more particularly, to determining a set of paths for routing data from a source network node to a destination network node.

Data networks may include any number of routers and other devices that direct the transmission of data from one location to another. For example, a source network node (e.g., a computer, a server, a data center, a router, etc.) may transmit data to a destination network node (e.g., another computer, data center, router, etc.) via the data network using any number of different paths. Each data link in a given path may also have a number of associated characteristics (e.g., latency, bandwidth, etc.).

SUMMARY

Implementations of systems and methods for splitting a network traffic flow in a data network are described herein. One implementation is a method for splitting a flow of data in a data network into a set of flow paths. The method includes retrieving, from a memory, map data including a plurality of network nodes and a plurality of data links between the network nodes. Each data link has an associated flow value. The method includes receiving, at a processing circuit, a selection of a source node and a selection of a destination node from the plurality of network nodes. The method also includes sorting the data links based in part on the associated flow values and determining, by the processing circuit, a submap of the map data using the sorted data links. The submap has a maximum flow between the selected source node and the selected destination node that is greater than a predefined percentage of a maximum flow between the selected source node and the selected destination node in the map data. The method further includes adjusting flow capacities of data links in the submap based on a smallest flow capacity of a data link in the submap. The method also includes determining, by the processing circuit, a set of flow paths from the source node to the destination node using the adjusted flow capacities.

Another implementation is a system for splitting a flow of data in a data network into a set of flow paths. The system includes a processing circuit configured to retrieve map data including a plurality of network nodes and a plurality of data links between the network nodes. Each data link has an associated flow value. The processing circuit is also configured to receive a selection of a source node and a selection of a destination node from the plurality of network nodes. The processing circuit is further configured to sort the data links based in part on the associated flow values and to determine a submap of the map data using the sorted data links. The submap has a maximum flow between the selected source node and the selected destination node that is greater than a predefined percentage of a maximum flow between the selected source node and the selected destination node in the map data. The processing circuit is configured to adjust flow capacities of data links in the submap based on a smallest flow capacity of a data link in the submap. The processing circuit is also configured to determine a set of flow paths from the source node to the destination node using the adjusted flow capacities.

A further implementation is computer-readable media having instructions stored therein, the instructions being executable by one or more processors to cause the one or more processors to perform operations. The operations include retrieving, from a memory, map data comprising a plurality of network nodes and a plurality of data links between the network nodes. Each data link has an associated flow value. The operations include receiving a selection of a source node and a selection of a destination node from the plurality of network nodes. The operations include sorting the data links based in part on the associated flow values. The operations also include determining a submap of the map data using the sorted data links. The submap has a maximum flow between the selected source node and the selected destination node that is greater than a predefined percentage of a maximum flow between the selected source node and the selected destination node in the map data. The operations further include adjusting flow capacities of data links in the submap based on a smallest flow capacity of a data link in the submap. The operations also include determining a set of flow paths from the source node to the destination node using the adjusted flow capacities.

These implementations are mentioned not to limit the scope of the disclosure, but to provide examples to aid in understanding thereof. Particular implementations can be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION

According to some aspects of the present disclosure, data may be routed in a data network between a source network node and a destination network node. In a typical data network, a number of intermediary network nodes separate the source network node from the destination network node. Network nodes are connected in the network by data links over which the data may be transmitted. The various intermediary data links between the source network node and the destination network node provide a number of different flow paths over which the data can travel. The total flow of data from the source network node to the destination network node may, therefore, be split among any number of flow paths.

In certain types of data networks, the total flow of data from a source network node to a destination network node is represented as a set of flow paths. For example, multiprotocol label switching (MPLS) networks, Openflow networks, and other types of data networks utilize path information to route data (e.g., the path over which data is to be sent is predetermined before the data is transmitted). In MPLS networks, labels are assigned to data packets at a first router known as a label edge router (LER). The appended labels contain path information used to route data throughout the network. The path corresponding to the label is often called a label switched path (LSP). Label switching routers (LSRs) receive the labeled data packets in MPLS networks and make routing decisions based on the content of a label.

Data links in a data network may have a number of associated characteristics that are used to determine how data should be routed. For example, a data link may have an associated latency time that is a measure of how long it takes for data to traverse the data link. In some implementations, the latency time may be measured using roundtrip ping times between network nodes. A data link may have an associated flow capacity (e.g., a bandwidth). In some networks, such as an MPLS network, the total bandwidth for a data link may also be divided into different traffic classes. Other characteristics, such as financial cost, weightings, etc., may also be used to determine which data links should be traversed when data is transmitted. These characteristics may be used to determine how a flow of data may be split into a set of flow paths in a data network. The set of flow paths can then be used in the network to determine how data is to be routed.

Figure 1:
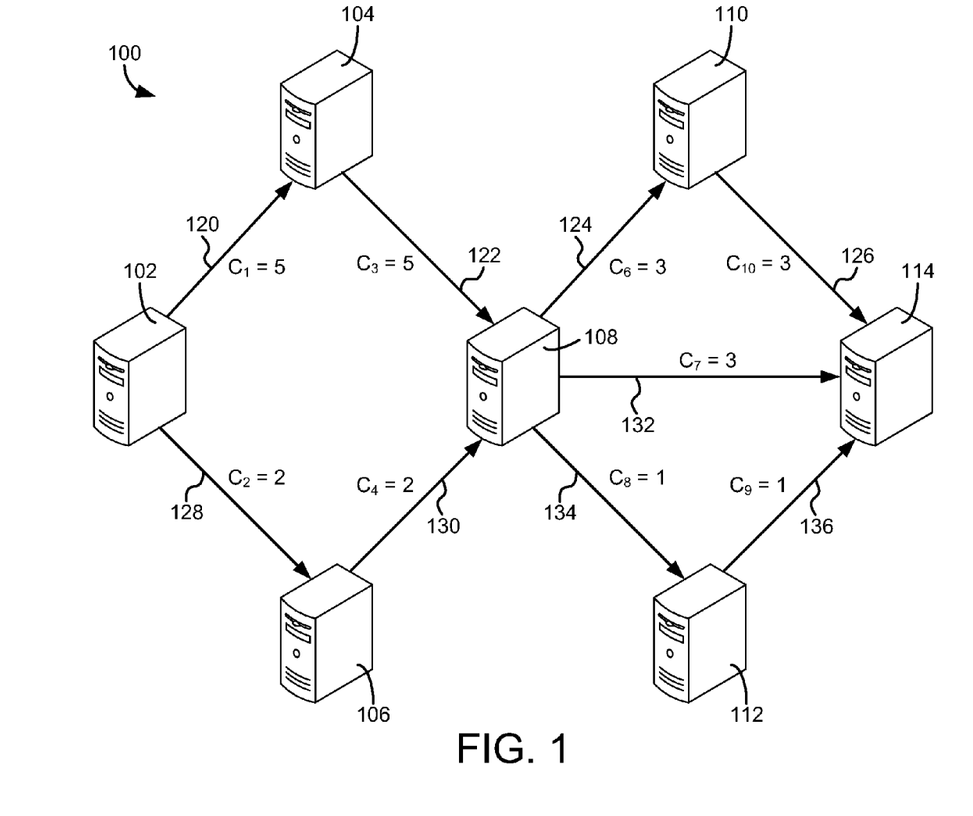
FIG. 1 is an illustration of an example of a data network.

FIG. 1 shows an illustration of an example data network 100. Data network 100 includes a plurality of network nodes 102-114 connected by data links 120-136. Each of network nodes 102-114 may be one or more electronic devices configured to transmit data within data network 100. For example, each of network nodes 102-114 may include one or more data centers, cloud computing network devices, servers, computers, routers, switches, mobile devices, and/or other computing devices.

Data network 100 is also shown to include data links 120-136, which allow data to be transmitted between network nodes 102-114. For example, source network node 102 may transmit data to network node 104 via data link 120. Data links 120 may be any type of hardwired and/or wireless data connection. For example, data link 120 may be a hardwired fiber optic line or a wireless satellite connection that conveys data from source network node 102 to network node 104. Data links 120-136 may be bidirectional or unidirectional. For example, data link 136 may be a bidirectional link that allows network node 112 to convey data to network node 114 and vice versa. In another example, data link 120 may be a unidirectional link that only allows data to be transmitted from source network node 102 to network node 104.

Each of data links 120-136 is shown to have an associated flow capacity, denoted $c_1$-$c_{10}$ in FIG. 1. In general, the capacity of a data link refers to the amount of flow of data that can be supported by the data link at any given time. For example, data link 120 may support a maximum flow of data of 10 Mb/s. The actual flow of data over a particular data link may differ from that of its capacity. For example, even though data link 120 may support a maximum flow of data of 10 Mb/s, only 5 Mb/s of data may traverse data link 120. As shown, flow capacities $c_1$-$c_{10}$ are represented in generic units of data flow to denote their relative capacities to one another. For example, data link 128 has an associated capacity of $c_2$=2, which is double that of data link 134 having an associated capacity of $c_8$=1.

The transmission of data from a source network node to a destination network node in data network 100 may follow any number of different paths. In general, a path may be an ordered set of data links and/or network nodes that are connected by data links. By way of example, source network node 102 may attempt to send data to destination network node 114 via data network 100. The data may be routed over a number of different paths. For example, one path may include data links 120, 122, 124, 126. Another path may include data links 128, 130, 134, 136.

The total flow of data from source network node 102 to destination network node 114 may be constrained by the capacities of data links 120-136. For example, the total amount of data flow from source network node 102 to destination network node 114 is a flow of seven units (e.g., $c_1+c_2=5+2=7$), at maximum. In other words, at maximum, seven units of data flow may be transmitted from source network node 102 at a given time. Similarly, destination network node 114 is able to receive, at maximum, seven units of data (e.g., $c_{10}+c_7+c_9=3+3+1=7$) at any given time. Flow is conserved for all potential intermediary network nodes between source network node 102 and destination network node 114, i.e., the flow of data into an intermediary network node equals the flow of data out of the intermediary network node. For example, in an MPLS network, network nodes 104, 106, 108, 110, 112 may be LSRs that relay the transmitted data from source network node 102 to destination network node 114 (e.g., network nodes 102 and 114 may be LERs). A labeled data packet received by an intermediary network node is then forwarded according to the LSP information in the packet.

The total flow of data in data network 100 from source network node 102 to destination network node 114 may be represented as a set of paths. For example, the following paths may be taken from source network node 102 to destination network node 114:

TABLE 1

| Data Links in Path | Flow Along Path |
| --- | --- |
| 120, 122, 134, 136 | 1 |
| 120, 122, 132 | 2 |
| 120, 122, 124, 126 | 2 |
| 128, 130, 132 | 1 |
| 128, 130, 124, 126 | 1 |

As shown in Table 1 above, the seven units of flow from source network node 102 to destination network node 114 can be split into five paths in data network 100.

In many data networks, an additional constraint is placed on the division of data flow into paths such that the flow is split into the smallest possible number of paths. For example, another potential division of the data flow in data network 100 from source network node 102 to destination network node 114 is as follows:

TABLE 2

| Data Links in Path | Flow Along Path |
| --- | --- |
| 120, 122, 132 | 3 |
| 120, 122, 124, 126 | 2 |
| 128, 130, 134, 136 | 1 |
| 128, 130, 124, 126 | 1 |

As shown in Table 2 above, the seven units of flow from source network node 102 to destination network node 114 can also be split into four paths in data network 100, which is the minimum number of paths possible. Therefore, the set of paths in Table 2 may be considered an optimal solution, given the additional constraint that the number of paths in the set may also be minimized, in some implementations.

The characteristics of data links 120-136 may be used to further constrain which paths are included in the determined set of paths, as well as the amount of data that flows over each path. For example, another possible division of the flow of data from source network node 102 to destination network node 114 is as follows:

TABLE 3

| Data Links in Path | Flow Along Path |
|---|---|
| 120, 122, 132 | 2 |
| 120, 122, 124, 126 | 3 |
| 128, 130, 134, 136 | 1 |
| 128, 130, 132 | 1 |

Similar to Table 2, the set of paths in Table 3 also contains four paths. Other sets containing four paths are also possible. In some implementations, characteristics of the data links of data network 100 may be used to determine the set of paths having the minimal number of paths.

In one example, the capacities of the data links may be used to split the flow of traffic into a set of paths. For example, one possible constraint may be that the paths must utilize higher bandwidth data links, if possible. A bandwidth-based, greedy approach may be used to select paths for the solution set. Paths may be selected to first utilize all of the bandwidth of higher capacity data links, before selecting data links that have lower capacities. In data network 100, the sets of paths in Tables 2 and 3 may both be possible solutions using a capacity constraint. Under this constraint, flow traversing data links 120, 122 may first be selected to transmit data over either data link 132 or data links 124, 126. Since either path (e.g., data links 120, 122, 124, 126 or data links 120, 122, 132) may be equally filled with a flow of three units, either path choice is satisfies this condition. This process continues until the sets of paths in Tables 2 or Table 3 are determined. Depending on the network topology, the capacity constraint may further distinguish between solution sets having an equal number of paths.

In another example, the latency along a path may be used to determine the solution set of paths. One possible constraint is that the lowest latency path should always be selected first. A latency-based, greedy approach may be used to select paths in the solution set. For example, the latency may differ along the different data links separating network node 108 and destination network node 114. Data link 132 may have a lower latency than that of data paths 124, 126 or data paths 134, 136, since the data does not need to be rerouted from an intermediary node (e.g., network node 110 or network node 112). If the latency along data links 120, 122 is less than that of data links 134, 136, the set of paths in Table 2 would be the solution set over that of Table 3. This is because the data traversing data link 132 in Table 2 originates from the lower latency data links 120, 122. In this way, the solution set of paths from the source network node to the destination network node of a data network may route data in the lowest possible amount of time and over the minimal number of paths.

The number of possible ways to split the flow of data into paths in a data network increases exponentially with the number of intermediary data links. This makes determining the solution set having the least number of paths computationally intensive. The only way to ensure that the set having the least number of paths has been found is to evaluate all possible combinations of paths in the data network, which grows exponentially with the number of intermediary network nodes. Therefore, approaches that attempt to find a near-optimal solution may be utilized to reduce the computational time.

Figure 2:
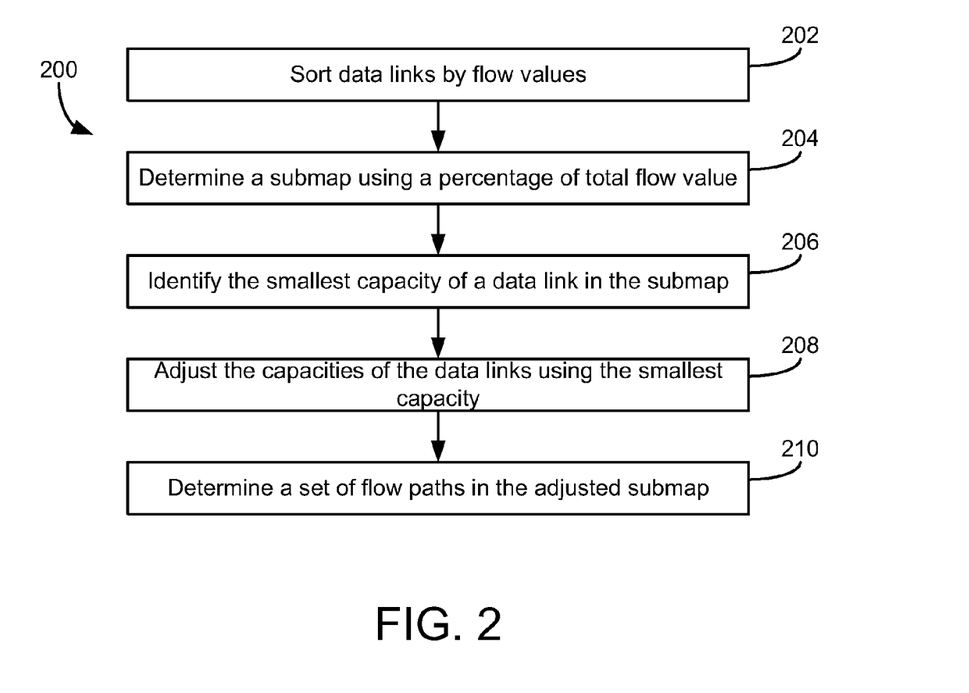
FIG. 2 is a flow diagram of an example process for splitting a flow of traffic in a data network.

FIG. 2 is a flow diagram of an example process 200 for splitting a flow of traffic in a data network. Process 200 may be used to determine a set of paths in the data network from a source network node to a destination network node over which a flow of traffic may be divided. Process 200 operates to reduce the number of data links that are evaluated through the use of a submap. This has the effect of reducing the amount of computational time needed to execute process 200 versus an approach that seeks an optimal solution. While process 200 may determine a solution set having more paths than that of the optimal set, certain performance goals are met as to the amount of flow that can be routed using process 200, as well as the number of paths that result from process 200 in relation to the optimal set.

Process 200 includes sorting data links by flow values (block 202). The flow value for a data link refers to the flow of traffic over the data link that traverses from a source network node to a destination network node. For any particular data link, the flow value may be divided among any number of different paths from the source network node to the destination network node. For example, a particular data link having two units of flow may have two units of flow along the same path or one unit of flow along each of two different paths. In one example, the flow values for data network 100 in FIG. 1 are as follows, assuming that a maximal amount of traffic (e.g., seven units of flow) traverses from source network node 102 to destination network node 114:

TABLE 4

| Data Link | Flow Value |
|---|---|
| 120 | 5 |
| 122 | 5 |
| 124 | 3 |
| 126 | 3 |
| 132 | 3 |
| 128 | 2 |
| 130 | 2 |
| 134 | 1 |
| 136 | 1 |

Sorting the data paths by flow values allows some of the data links in data network 100 to be disregarded from evaluation in process 200. This has the effect of reducing the amount of computations needed to determine the solution set of flow paths.

Process 200 includes determining a submap using a percentage of total flow value (block 204). To reduce the number of computations needed to determine a set of paths that split a flow of traffic in a data network, a submap of the data network may be evaluated instead of the entire data network. The submap may be determined by disregarding at least one of the intermediary network nodes between the source network node and the destination network node (e.g., the submap may be constructed by removing network nodes from the data network). Similarly, data links that connect to and from a disregarded intermediary network node may also be disregarded in the submap.

If a data link having a non-zero flow value is removed in the submap, the submap will be able to support a maximum amount of flow that may be less than that of the total flow for the full data network. For example, if network node 112 is removed from data network 100 in FIG. 1, the maximum amount of flow possible in the submap from source network node 102 to destination network node 114 is six units of flow. This is because removal of network node 112 also removes its corresponding data links 134, 136, over which one unit of flow is able to traverse. Destination network node 114 is therefore only able to receive, at maximum, a total of six units of flow in the submap instead of the seven possible units of flow in the full data network.

A percentage of total flow may be used to control the size of the submap. For example, an epsilon value may be selected such that $0<\epsilon<1$. The total amount of flow in the full data network from the source network node to the destination network node may also be represented by F. In this case, the percentage of total flow can be represented as $(1-\epsilon)$ and the fractional flow in the submap represented as $(1-\epsilon)F$. For example, if $\epsilon$ is ⅓, the corresponding percentage of total flow may be represented as ⅔ of the total flow.

In some implementations, the percentage of total flow may be used as a constraint when the submap is determined. One possible constraint may be that the maximum flow in the submap between the source network node and the destination network node should be at least $(1-\epsilon)F$. For example, if $\epsilon=¼$, the maximum flow between the source and destination network nodes in the submap should be at least 75% of that of the full data network. In such a case, the sorted data links may be selected until the submap satisfies this constraint. Data nodes having the highest flow values may be selected from the sorted list until the resulting submap satisfies the percentage of total flow constraint. In this way, data links in the data network that have a low amount of flow are disregarded in the submap.

Process 200 includes identifying the smallest capacity of a data link in the submap (block 206). When data links are removed to determine the submap, the capacities of the remaining data links in the submap may be evaluated. For example, removal of data links 134, 136 in data network 100 of FIG. 1 to generate a submap results in data links 128, 130 results in data links 128, 130 having the smallest capacities in the submap.

Process 200 includes adjusting the capacities of the data links in the submap using the smallest capacity in the submap (block 208). Since data links are removed from the full data network to form the submap, a data link in the submap may not be able to utilize its full flow capacity. For example, data links 120, 122 and data links 128, 130 in data network 100 of FIG. 1 have a total capacity of seven units of flow. However, removal of data links 134, 136 to form a submap means that only six units of flow are able to reach destination network node 114 in the submap. This also means that remaining intermediary network nodes may no longer retain the property that the amount of data flow that enters the node is equal the to the amount of flow that exits the node. Therefore, the flow capacities may be adjusted such that the capacities of the data links in the submap are multiples of some value that is based on the smallest flow capacity in the submap.

In one implementation, a delta value may be selected such that $0\leq\delta\leq1$. The delta value may be used to adjust the flow capacities of the data links in the submap by scaling down the flow capacities such that each data link has an adjusted flow capacity that is a multiple of $\delta x$, where x is the smallest identified flow capacity in the submap. Doing so provides a mathematical limit that the maximum flow from the source network node to the destination network node in the adjusted submap is at least $$\frac{1-\varepsilon}{1+\delta}F.$$

This follows from the constraint that the submap is able to route at least $(1-\epsilon)F$ of flow. Scaling down the capacities in such a submap also means that the adjusted submap is able to route at least $$\frac{1-\varepsilon}{1+\delta}F$$

of flow.

Process 200 includes determining a set of flow paths in the adjusted submap (block 210). The maximum flow in the adjusted submap can then be decomposed arbitrarily into a set of paths. Each path in the decomposition has $\delta x$ units of flow, where x is the smallest flow capacity of the submap identified in block 206 and the decomposition has a total flow of at least $$\frac{1-\varepsilon}{1+\delta}F$$

units of flow. In addition, the number of paths in the set is at most $$\frac{1+\varepsilon}{(1+\delta)\varepsilon\delta}*OPT,$$

where OPT is the optimal (i.e., minimal) number of path in a decomposition of the flow for the full data network. This also provides a limit as to the number of paths identified by process 200 in relation to that of the optimal solution. The set of paths generated by process 200 may then be used, for example, to route data in the data network.

Figure 3:
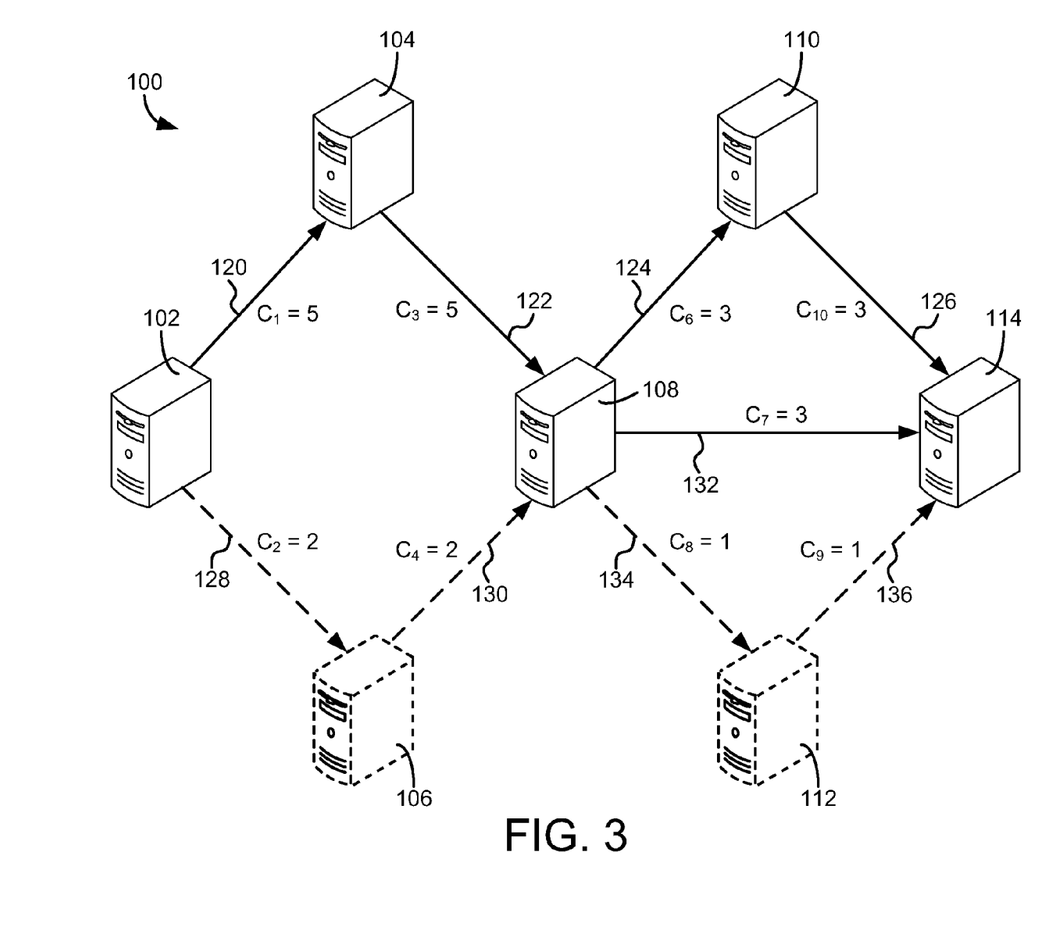
FIG. 3 is an illustration of dividing the data network of FIG. 1 into a submap, according to an example.

FIG. 3 is an illustration of dividing data network 100 of FIG. 1 into a submap, according to an example. In the example of FIG. 3, an epsilon value of $\epsilon=⅓$ has been chosen, giving the constraint that the submap must support a maximum flow of at least $(⅔)F$. In other words, the percentage of total flow value used to construct the submap is ⅔ of the total possible data flow from source network node 102 to destination network node 114 in data network 100. Since the total flow in data network 100 from source network node 102 to destination network node 114 is seven units of flow, the requirement is that the submap be determined such that the maximum amount of flow from source network node 102 to destination network node 114 in the submap is at least (⅔)*7=~4.667 units of flow.

The data links having the highest flow values in data network 100 (shown above in Table 4) may be selected until the constructed submap satisfies the flow constraint imposed by the percentage of total flow value (e.g., the submap supports a maximum flow from source network node 102 to destination network node 114 of at least ⅔ of the total flow supported by data network 100). This produces the following set of data links:

TABLE 5

| Data Link | Flow Value |
| --- | --- |
| 120 | 5 |
| 122 | 5 |
| 124 | 3 |
| 126 | 3 |
| 132 | 3 |

The data links in data network 100 shown above in Table 5 have flow values sufficient to ensure that the submap supports a total flow from source network node 102 to destination network node 114 of at least ~4.667. In particular, the data links in the submap formed using the data links in Table 5 support a maximum flow from source network node 102 to destination 114 of five units, meaning that the constraint imposed by the percentage of total flow value has been satisfied.

Data links in data network 100 having flow values less than the data links in Table 5 are disregarded to form a submap. As shown, the data links and network nodes of data network 100 that are disregarded when constructing the submap are represented using dashed lines. The remaining data links and network nodes make up the submap that is used in further evaluations. This means that network nodes 106, 112 and data links 128, 130, 134, 136 are not evaluated, thereby reducing the number of computations needed to split the flow of traffic from source network node 102 to destination network node 114.

Figure 4:
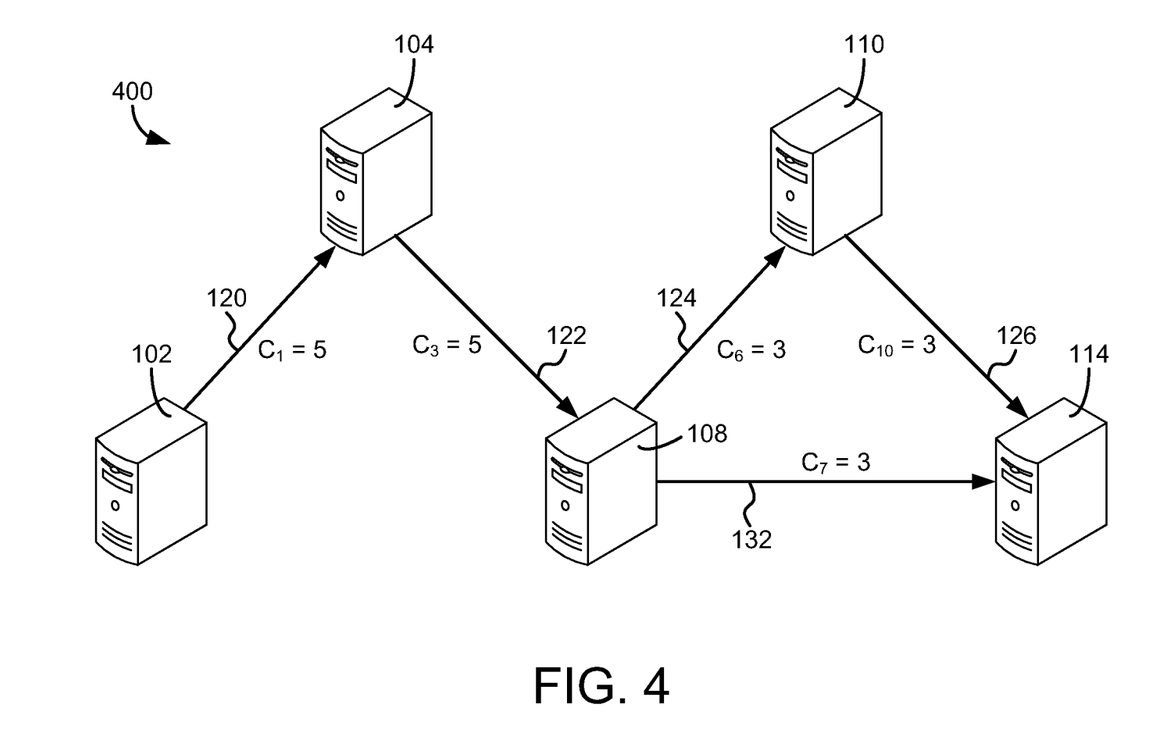
FIG. 4 is an illustration of an example submap.

FIG. 4 is an illustration of an example submap 400 of data network 100. Submap 400 is constructed by removing data links 128, 130, 134, 136 from data network 100, as shown in FIG. 2. Submap 400 is able to transmit a maximum of five units of traffic flow from source network node 102 to destination network node 114. This satisfies the constraint that submap 400 be able to support a maximum data flow from source network node 102 to destination network node 114 of at least $2/3$ of the maximum possible flow in that of data network 100.

The data link having the smallest flow capacity in submap 400 may be identified and used to adjust the flow capacities in submap 400. This ensures that intermediary network nodes in submap 400 have the property that the data flow leaving a particular intermediary network node is equal to the amount of data flow entering the node. For example, if each data link in submap 400 is used at its flow capacity, five units of flow would arrive at network node 108 and six units of flow would leave network node 108. Such a result violates the requirement that data flow is conserved for intermediary network nodes. In submap 400, data links 124, 126, 132 each have a flow capacity of three units of flow, which is the smallest capacity of a data link in submap 400. Therefore, the flow capacity of each data link in submap 400 may be adjusted to be a multiple of some value that is based on the smallest flow capacity in submap 400.

Figure 5:
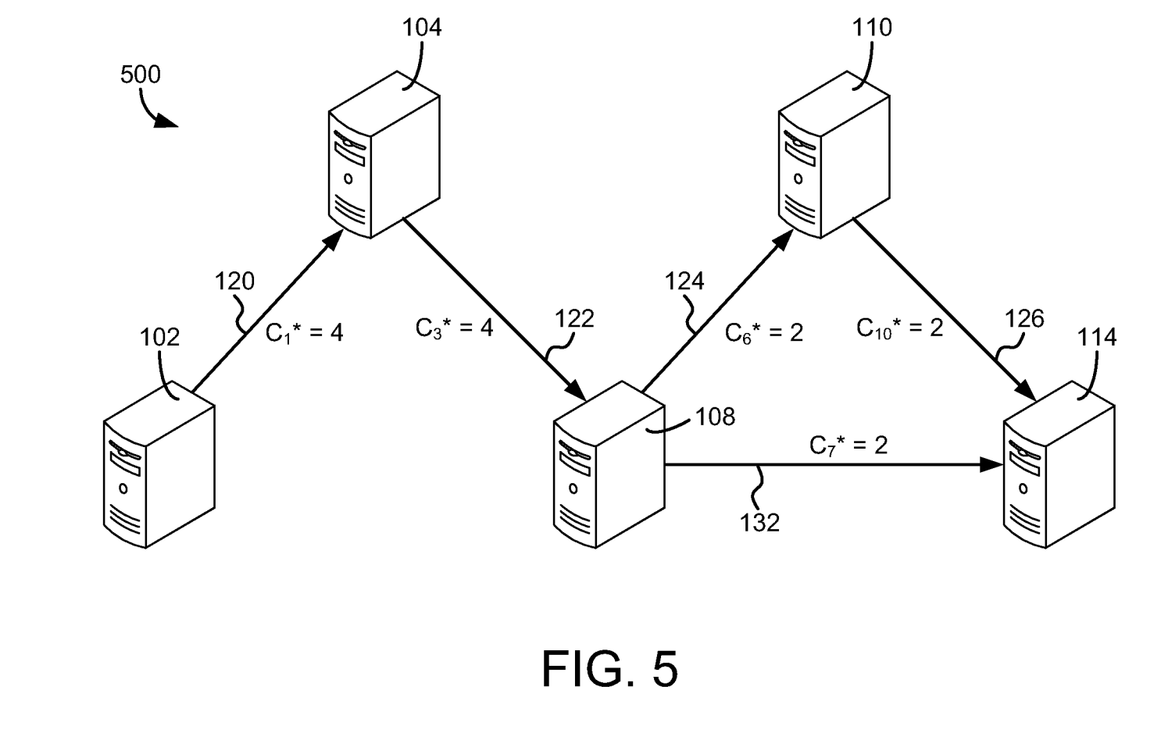
FIG. 5 is an illustration of an example adjusted submap having adjusted capacity values.

FIG. 5 is an illustration of an example adjusted submap 500 having adjusted capacity values. Adjusted submap 500 is constructed by adjusting the flow capacities of the data links in submap 400 of FIG. 4. For example, a delta value of $\delta=2/3$ may be used to adjust the capacities in submap 400 to determine adjusted submap 500. In submap 400, data links 124, 126, 132 each have the smallest flow capacities (e.g., flow capacities $c_6$, $c_7$, $c_{10}$, respectively) with flow capacities of three units of flow. Multiplying each of these flow capacities by the delta value results in adjusted flow capacities $c^*_6$, $c^*_7$, $c^*_{10}$, each having an adjusted flow capacity of two units (e.g., $\delta x=2$).

Data links 120, 122 each have flow capacities in submap 400 (e.g., flow capacities $c_1$, $c_3$, respectively) of five units of flow. These capacities are adjusted by rounding down the flow capacities to the largest multiple of the delta value times the smallest flow capacity in submap 400. The largest multiple of $\delta x=2$ in flow capacities $c_1$, $c_3$ is $(\delta x)*2=4$, so the adjusted flow capacities $c^*_1$, $c^*_3$ are each assigned a flow capacity of four units. Doing so results in the intermediary network nodes of adjusted submap 500 retaining their conservation of flow properties.

Adjusted submap 500 can be utilized to determine a set of flow paths. For example, the following flow paths may result from splitting the flow of data from source network node 102 to destination network node 114:

TABLE 6

| Data Links in Path | Flow Along Path |
| --- | --- |
| 120, 122, 132 | 2 |
| 120, 122, 124, 126 | 2 |

The set of flow paths in Table 6 are able to route a total of four units of flow in adjusted submap 500, as well as in data network 100. While this set of flow paths may not decompose the total flow available in data network 100, certain performance limits exist when using process 200. In some implementations, a non-optimal solution may be acceptable for use when routing data, so long as the solution can be determined in fewer computations than that of the optimal solution. Therefore, the performance limits from using process 200 can be used to determine whether the set of paths that result from process 200 would be acceptable for use in a particular network.

In one example, process 200 may result in a set of paths in which a maximum flow from the source network node to the destination network node is at least $$\frac{1-\varepsilon}{1+\delta}F.$$

The value F represents the maximum flow possible from the source network node 102 to the destination network node 114 in data network 100 (e.g., seven units of flow in this case). The set of paths in Table 6 were generated using $\delta=2/3$ and $\delta=1/3$. This leads to the mathematical performance limit that, at minimum, $$\frac{1-\varepsilon}{1+\delta}F = \frac{1-(1/3)}{1+(2/3)}(7) = 2.8$$

units of flow can be routed from source network node 102 to destination network node 114 using the set of paths in Table 6. As shown above, the set of paths in Table 6 are able to route a total of four units of flow, showing that the performance limit holds true.

Figure 6:
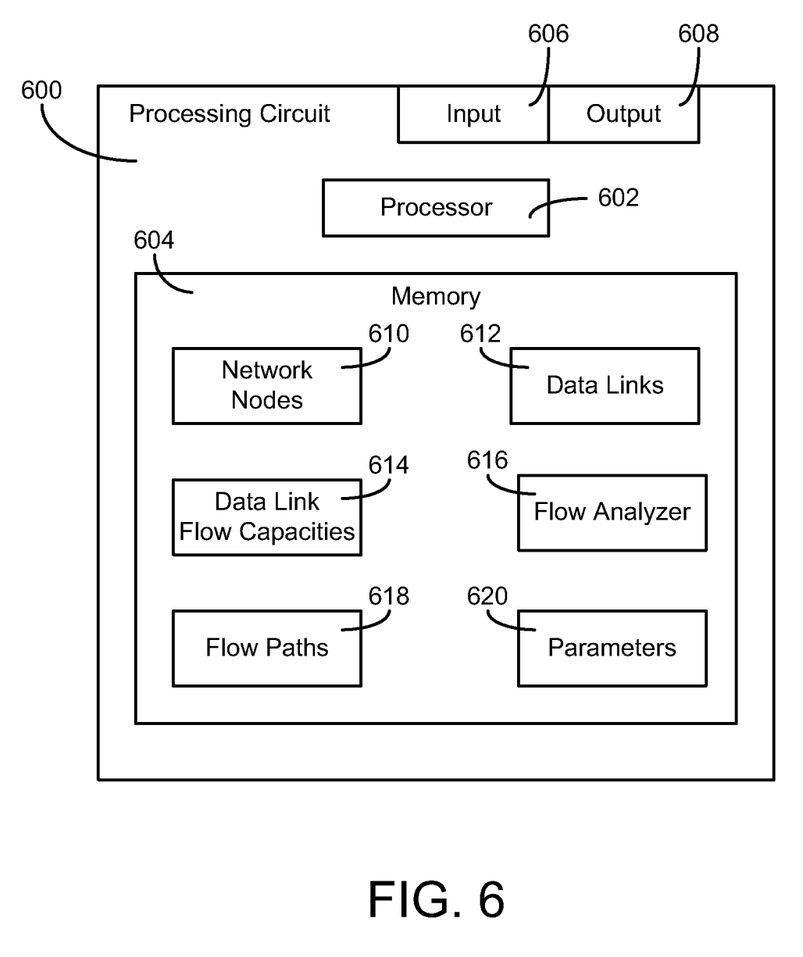
FIG. 6 is a schematic block diagram of an example processing circuit configured to determine a set of flow paths in a data network.

FIG. 6 shows a detailed block diagram of a processing circuit 600. Processing circuit 600 may be within, for example, a network router, a server, or another device connected to a data network. Processing circuit 600 includes a processor 602 and a memory 604. Processor 602 may be or include one or more microprocessors, an application specific integrated circuit (ASIC), a circuit containing one or more processing components, a group of distributed processing components, circuitry for supporting a microprocessor, or other hardware configured for processing. Processor 602 is also configured to execute computer code stored in memory 604 to complete and facilitate the activities described herein. Memory 604 can be any volatile or non-volatile computer-readable medium capable of storing data or computer code relating to the activities described herein. For example, memory 604 is shown to include flow analyzer 616, which may be implemented using computer code (e.g., executable code, object code, source code, script code, machine code, etc.) configured for execution by processor 602. When executed by processor 602, processing circuit 600 is configured to complete the activities described herein.

Processing circuit 600 also includes hardware circuitry for supporting the execution of the computer code flow analyzer 616. For example, processing circuit 600 may include hardware interfaces (e.g., an output 608) for communicating a set of flow paths 618 (e.g., a set of paths comprising data links from a source network node to a destination network node) to other computing devices (e.g., another router, another server, a mobile device, etc.). Processing circuit 600 may also include an input 606 for receiving, for example, a set of network nodes 610, data links 612, data link flow capacities 614, and/or parameters 620 from other computing devices.

Memory 604 includes network nodes 610, which represent the set of network nodes in the data network to be analyzed. Network nodes 610 may include, for example, information representative of a set of data centers, routers, servers, or other electronic devices configured to receive and/or transmit data via the data network. In some implementations, network nodes 610 may be a partial set of the network nodes in the data network. For example, certain nodes in the data network may be excluded from analysis by flow analyzer 616 when a set of flow paths 618 from a source network node to a destination network node is determined.

Memory 604 includes data links 612, which represent links of the data network over which two or more network nodes communicate. Data links 612 may include, for example, information representative of the two or more network nodes (e.g., a set of pointers to network nodes 610, a list of unique identifiers of network nodes 610, etc.) for a given data link. Data links 612 may also include information indicative of a direction of data flow over a link. For example, data links 612 may be unidirectional or bidirectional, depending on the configuration of the data network. If data can travel in two over more directions, each direction of flow may be represented separately in data links 612, in some implementations. For example, the connection from node A to node B may be stored as a separate data link in data links 612 than that of the connection from node B to node A. Data links 612 may also include one or more metrics or other characteristics of the data links. For example, the latency, financial cost, physical distance, or other information associated with the data links may also be stored in data links 612.

Memory 604 includes data link flow capacities 614, which are associated with data links 612. Data link flow capacities 614 may include the total bandwidth, the fractional bandwidth (e.g., the bandwidth allocated to a priority class in an MPLS network, etc.), or any other metric related to the amount of flow that may be transmitted over data links 612. Data link flow capacities 614 may be received from one or more other processing circuits via input 606 or determined by processing circuit 600, according to various implementations.

Memory 604 includes parameters 620. Parameters 620 are used to control the operation of processing circuit 600. Parameters 620 may include one or more data values that cause processing circuit 600 to operate differently, depending on the data values. For example, parameters 620 may include a selection of a source network node and a destination network node received via input 606. These may be used by flow analyzer 616 to generate a set of flow paths 618 between the source network node and the destination network node. In some implementations, parameters 620 may include a percentage of total flow value for use by flow analyzer 616. For example, parameters 620 may include a value $\epsilon=\frac{1}{3}$, which specifies that flow analyzer 616 is to determine a submap using network nodes 610 and data links 612 such that the paths route at least ⅔ of the maximum flow (e.g., a percentage of total flow value). In some implementations, parameters 620 may include a delta value such that the maximum flow between the source network node to the destination network node using flow paths 618 in the submap is at least $$\frac{1-\varepsilon}{1+\delta}$$

of the maximum possible amount of flow in the complete data network. Other examples of parameters 620 include parameters that control how often flow paths 618 are generated, how flow paths 618 are used, and whether certain members of network nodes 610 or data links 612 should be excluded from analysis by flow analyzer 616 when determining flow paths 618. For example, a particular network node in network nodes 610 may be down for maintenance for a certain amount of time. In such a case, a parameter in 620 may be utilized to exclude that particular network node from being evaluated by flow analyzer 616 as part of the complete data network.

Flow analyzer 616 utilizes the selected source network node and destination network node in parameters 620, network nodes 610, data links 612, and data link flow capacities 614, to generate flow paths 618. In some implementations, flow analyzer 616 may use process 200 to generate flow paths 618. In such a case, flow analyzer 616 may sort data link flow capacities 614. Flow analyzer 616 may use a percentage of flow value stored in parameters 620 and the sorted data link flow capacities 614 to determine a submap of the data network defined by network nodes 610 and data links 612. The submap may be constrained such that its maximum amount of flow between the source network node and the destination network node is at least a certain percentage of the total possible flow between the two nodes using the full data network. Flow analyzer 616 may identify the smallest flow capacity of a data link in the submap and adjust the flow capacities of the data links in the submap using the identified flow capacity. For example, the flow capacities in the submap may be adjusted using a delta value stored in parameters 620 such that each flow capacity in the submap is a multiple of the delta value times the identified capacity, rounded down. Flow analyzer 616 may then use the adjusted submap to determine flow paths 618, which route at least a certain percentage of the maximum amount of flow using the full data network.

Flow analyzer 616 generates flow paths 618 and may store them within memory 604. Flow paths 618 includes one or more paths from the source network node to the destination network node, as determined by flow analyzer 616. In general, each of flow paths 618 includes an ordered set of one or more of data links 612. Flow paths 618 may include, for example, a set of pointers to data links 612, listings of data links 612, etc. In some implementations, flow paths 618 may include any number of sets of flow paths between different source and/or destination network nodes. For example, flow paths 618 may include a set of flow paths from a source network node to a first destination network node and a set of flow paths from the source network node to a second destination network node.

Flow paths 618 may be used to make routing decisions in the data network. For example, processing circuit 600 may provide flow paths 618 to routers or other devices in a data network via output 608. In another implementation, processing circuit 600 may use flow paths 618 to determine where data is to be sent from processing circuit 600. For example, processing circuit 600 may receive a request via input 606 to send data to another device via output 608 and utilize flow paths 618 to determine how the data is to be sent to the other device.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. For example, while certain implementations are described herein with respect to routing data in a data network, the methodologies described could also be applied to other areas, such as determining the best routes of a map that may be traveled by a person or vehicle. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for splitting a flow of data in a data network into a set of flow paths comprising:
retrieving, from a memory, map data comprising a plurality of network nodes and a plurality of data links between the network nodes, wherein each data link has an associated flow value and an associated flow capacity;
receiving, at a processing circuit, a selection of a source node and a selection of a destination node from the plurality of network nodes;
sorting the data links based in part on the associated flow values;
determining, by the processing circuit, a submap of the map data using the sorted data links, wherein the submap has a maximum flow between the selected source node and the selected destination node that is greater than a predefined percentage of a maximum flow between the selected source node and the selected destination node in the map data;
adjusting flow capacities of data links in the submap based on a smallest flow capacity of a data link in the submap; and
determining, by the processing circuit, a set of flow paths from the source node to the destination node using the adjusted flow capacities.

2. The method of claim 1, wherein flow is conserved for each network node between the source node and the destination node.

3. The method of claim 1, wherein the set of flow paths is determined based in part on bandwidth of the data links in the submap.

4. The method of claim 1, wherein the set of flow paths is determined based in part on latency of the data links in the submap.

5. The method of claim 1, further comprising providing the set of flow paths to another processing circuit.

6. The method of claim 1, wherein the flow capacity of each data link corresponds to a maximum bandwidth allocated to a respective priority class in the data network.

7. The method of claim 1, wherein the network nodes correspond to nodes in an MPLS network.

8. A system for splitting a flow of data in a data network into a set of flow paths comprising a processing circuit configured to:
retrieve map data comprising a plurality of network nodes and a plurality of data links between the network nodes, wherein each data link has an associated flow value and an associated flow capacity;
receive a selection of a source node and a selection of a destination node from the plurality of network nodes;
sort the data links based in part on the associated flow values;
determine a submap of the map data using the sorted data links, wherein the submap has a maximum flow between the selected source node and the selected destination node that is greater than a predefined percentage of a maximum flow between the selected source node and the selected destination node in the map data;
adjust flow capacities of data links in the submap based on a smallest flow capacity of a data link in the submap; and
determine a set of flow paths from the source node to the destination node using the adjusted flow capacities.

9. The system of claim 8, wherein flow is conserved for each network node between the source node and the destination node.

10. The system of claim 8, wherein the set of flow paths is determined based in part on bandwidth of the data links in the submap.

11. The system of claim 8, wherein the set of flow paths is determined based in part on latency of the data links in the submap.

12. The system of claim 8, further comprising providing the set of flow paths to another processing circuit.

13. The system of claim 8, wherein the flow capacity of each data link corresponds to a maximum bandwidth allocated to a respective priority class in the data network.

14. The system of claim 8, wherein the network nodes correspond to nodes in an MPLS network.

15. Non-transitory computer-readable media having instructions stored therein, the instructions being executable by one or more processors to cause the one or more processors to perform operations comprising:
- retrieving, from a memory, map data comprising a plurality of network nodes and a plurality of data links between the network nodes, wherein each data link has an associated flow value and an associated flow capacity;
- receiving a selection of a source node and a selection of a destination node from the plurality of network nodes;
- sorting the data links based in part on the associated flow values;
- determining a submap of the map data using the sorted data links, wherein the submap has a maximum flow between the selected source node and the selected destination node that is greater than a predefined percentage of a maximum flow between the selected source node and the selected destination node in the map data;
- adjusting flow capacities of data links in the submap based on a smallest flow capacity of a data link in the submap; and
- determining a set of flow paths from the source node to the destination node using the adjusted flow capacities.

16. The non-transitory computer-readable media of claim 15, wherein flow is conserved for each network node between the source node and the destination node.

17. The non-transitory computer-readable media of claim 15, wherein the set of flow paths is determined based in part on bandwidth of the data links in the submap.

18. The non-transitory computer-readable media of claim 15, wherein the set of flow paths is determined based in part on latency of the data links in the submap.

19. The non-transitory computer-readable media of claim 15, wherein the operations further comprise providing the set of flow paths to a network router.

20. The non-transitory computer-readable media of claim 19, wherein the network router is a router in an MPLS network.

* * * * *